(12) United States Patent
Peach et al.

(10) Patent No.: US 12,468,615 B2
(45) Date of Patent: Nov. 11, 2025

(54) SYSTEM AND METHOD FOR SIGNALING INTERFACE STATUS USING A SINGLE INDICATOR

(71) Applicant: Arista Networks, Inc., Santa Clara, CA (US)

(72) Inventors: John Peach, London (GB); Harold Wang, Santa Clara, CA (US); Martin Hull, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 34 days.

(21) Appl. No.: 18/420,516

(22) Filed: Jan. 23, 2024

(65) Prior Publication Data

US 2025/0238339 A1 Jul. 24, 2025

(51) Int. Cl.
*G06F 11/32* (2006.01)
*G08B 5/38* (2006.01)

(52) U.S. Cl.
CPC .............. *G06F 11/325* (2013.01); *G08B 5/38* (2013.01)

(58) Field of Classification Search
CPC .................................. G06F 11/325; G08B 5/38
See application file for complete search history.

(56) References Cited

U.S. PATENT DOCUMENTS

| | | | |
|---|---|---|---|
| 2009/0046707 A1* | 2/2009 | Smires | H04M 7/0069 370/352 |
| 2011/0043371 A1* | 2/2011 | German | G06F 13/4282 340/815.45 |
| 2017/0075345 A1* | 3/2017 | Fisher | H04L 67/12 |
| 2017/0187648 A1 | 6/2017 | Kehrer et al. | |
| 2019/0342635 A1* | 11/2019 | Coffey | H04Q 1/136 |
| 2022/0131742 A1 | 4/2022 | Randall et al. | |

OTHER PUBLICATIONS

Extended European Search Report issued for European Patent Application No. 25152528.3, mailed Jun. 16, 2025, 7 pages.

* cited by examiner

*Primary Examiner* — Omeed Alizada
(74) *Attorney, Agent, or Firm* — Sprinkle IP Law Group

(57) ABSTRACT

A flash definition specifying a flashing sequence for a status indicator of a multi-lane port is stored on a device. In operation, the status indicator is lit, following the flashing sequence, to indicate a current lane state (in a Port/Lane Signaling Mode) or interface/channel state (in an Interface/Channel Signaling Mode). The flashing sequence may begin with a preamble, indicating a start of the flashing sequence. The device may have different multi-lane ports, each having one or more status indicators configured for indicating states of multiple lanes or a state of an interface having a multiple of component lanes. Flashing sequences for these ports are synchronizable (to the port having the largest number of lanes or, in the Interface/Channel Signaling Mode, the largest number of configured interfaces on that port). The lanes of a multi-lane port may operate at the same or different speeds and may be bundled into interfaces/channels.

20 Claims, 6 Drawing Sheets

```
Number of Flashes:
                  1        2        3        4        4
1......8......6.......4.......2.......0.......8....
                                   ↑
                                   ¦
Sequence:                          ¦
                                   ¦
                                   ↓
w.w...uu..uu..rr..uu.............
```

FIG. 4

```
Number of Flashes:
                  1        2        3        4        4
1......8......6.......4.......2.......0.......8....
                                   ↑
                                   ¦
Sequence:                          ¦
                                   ¦
                                   ↓
uuuuuuuuuuuuuuuuuuuuuuuuuuuuuuuuuu
```

FIG. 5

```
Number of Flashes:
                        1       2       3       4       4
1......8.......6.......4.......2.......0.......8....

Sequence:

w.w...uu..uu..uu..uu...b.b.b.b...
```

SYSTEM AND METHOD FOR SIGNALING INTERFACE STATUS USING A SINGLE INDICATOR

TECHNICAL FIELD

This disclosure relates generally to networking devices. More particularly, this disclosure relates to systems and methods for signaling network interface status utilizing a single status indicator such as a light emitting diode per port, including multi-lane ports.

BACKGROUND OF THE RELATED ART

Networking devices have moved from having a single signal lane per a front panel (physical) port to ports with 4, 8, or even 16 signal lanes. In some cases, these signal lanes can be combined to form logical interfaces (which are also referred to herein as "channels"). For instance, a 4-lane port could be used as a single interface or channel (with all 4 signal lanes subsumed) or 4 individual interfaces (breakouts), each corresponding to a signal lane.

Traditionally, light emitting diodes (LEDs) would be used as tell-tales to signal the state of a port to a local operator who's physically present. However, to provide today's networking devices with the same capability, each respective physical port may need to rely on 4, 8, or even 16 LEDs, regardless of whether the respective port is configured for breakouts or with combined interfaces/channels. The increasing number of LEDs involved creates design, manufacturing, quality, and cost challenges and contributes to unnecessary energy consumption and future e-waste.

Existing solutions to these problems entail either continuing to add more LEDs to the networking devices (which does not solve any problems) or reducing the LED count but without retaining the visual indication of status that is important to end users when administering or troubleshooting networking devices.

In view of the foregoing, there is a need for innovations and improvements in signaling network interface status. This disclosure addresses this need and more.

BRIEF DESCRIPTION OF DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

FIG. 4 shows an example of a flashing sequence of a single network interface status indicator for a 4-lane port in which three lanes are up, with the third lane having a remote fault, according to some embodiments disclosed herein.

FIG. 5 shows an example of a flashing sequence of a single network interface status indicator for a 4-lane port in which all four lanes are up, according to some embodiments disclosed herein.

DETAILED DESCRIPTION

Figure 1:
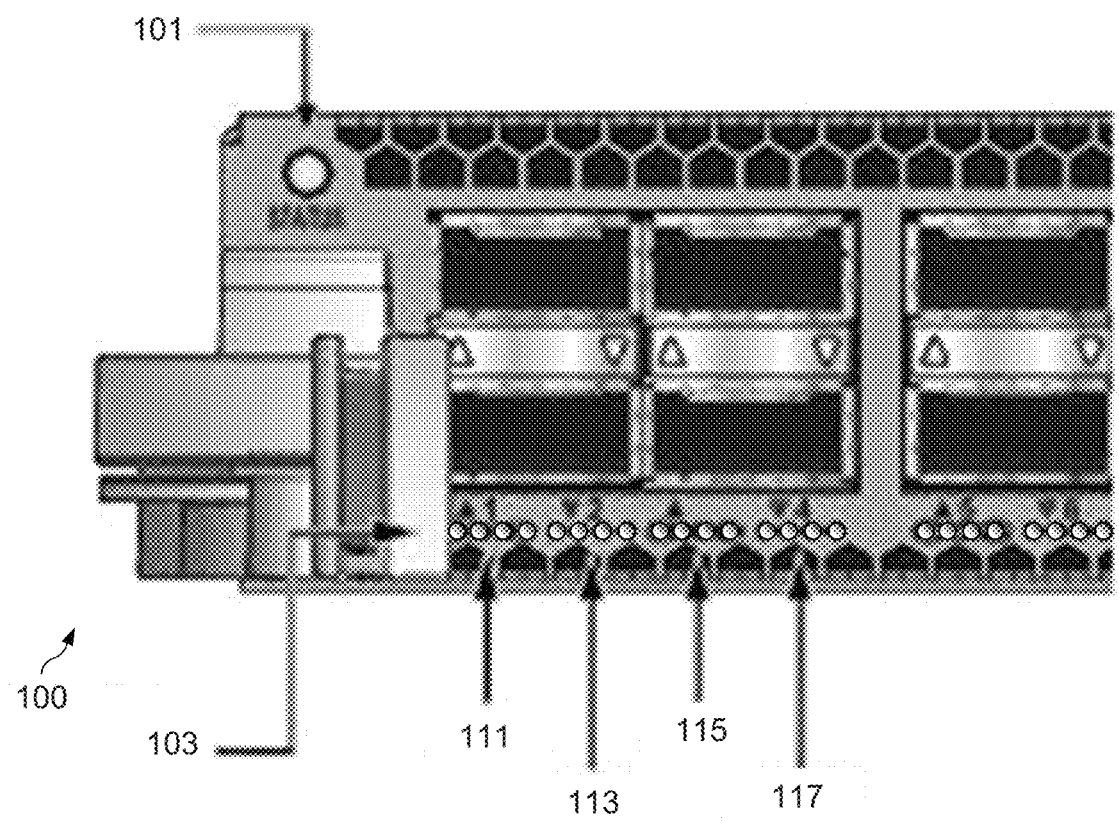
FIG. 1 shows a portion of a front panel of a networking device with a plurality of 4-lane ports, each having four status indicators.

Specific embodiments will now be described with reference to the accompanying figures (FIGS). The figures and the following description describe certain embodiments by way of illustration only. One skilled in the art will readily recognize from the following description that alternative embodiments of the structures and methods illustrated herein may be employed without departing from the principles described herein. It is noted that wherever practicable similar or like reference numbers may be used in the figures and may indicate similar or like functionality.

Networking devices provide a number of ports that are used to connect to other devices, such as computers, storage systems, or other networking devices. It is common for each port on a networking device to have one or more dedicated status indicators (e.g., LEDs) to provide a visual indication of the current state of the port to a local technician/operator. Many technicians rely on such dedicated LEDs to troubleshoot link issues in person.

By way of example, a two-color (e.g., green and amber) LED could be used to signal whether a port on a networking device (which is also referred to herein as a "system") is enabled/working, administratively disabled, or not working. This two-color LED could implement a coding system as shown in Table 1 below, with each of the two colors corresponding to a particular state.

TABLE 1

| Port State | LED State |
| --- | --- |
| Port Enabled & Working | On/Green |
| Port Administratively Disabled | On/Amber |
| Port Not Working | Off |

With this coding system for a two-color LED, one color serves as a visual indication that the port is enabled and working, while another color serves as a visual indication that the port is administratively disabled. This conventional scheme works for networking devices with a relatively low density of ports, with each port carrying only one signaling lane.

As higher speed networking technologies continue to be developed, networking devices are moving from having a single signal lane per a front panel port to 4, 8, or even 16 signal lanes per port. Moreover, these signal lanes can be combined to form logical interfaces/channels. For instance, an example of a 4-lane port could be used as a single interface (with all 4 signal lanes subsumed) or 4 individual interfaces or channels (breakouts). To provide context at the system level, FIG. 1 shows a portion of the front panel of a switch 100 with LEDs for multi-lane ports 111, 113, 115, 117.

Port/Lane Signaling Mode

Those skilled in the art will appreciate that the switch 100 is a non-limiting example of a networking device having multi-lane ports. Embodiments disclosed herein can be implemented on various types of networking devices (e.g., switches, routers, access points, firewalls, gateways, network interface cards, etc.) and/or other types of devices (e.g., servers, printers, etc.) with multi-lane ports. These devices may implement programmable processors such as Application-Specific Integrated Circuits (ASICs), Network Processing Units (NPUs), and/or Field Programmable Gate Arrays (FPGAs). Although a single status indicator for a multi-lane port is described in this disclosure in the context of a switch, other implementations are also possible and anticipated. Therefore, the switch 100 shown in FIG. 1 is meant to be illustrative, rather than limiting.

In the example of FIG. 1, the front panel has a device-level status indicator (an LED 101) and port-level status indicators 103 (which can include four LEDs for each of 4-lane port 111, 4-lane port 113, 4-lane port 115, 4-lane port 117, etc.). Similarly, FIG. 2 shows an example of a 4-lane port 200 with four network interface status indicators 201.

Figure 2:
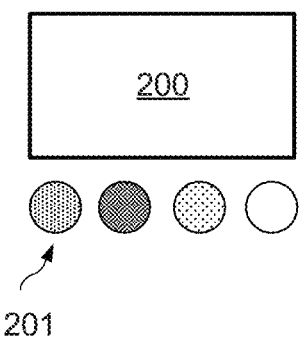
FIG. 2 shows an example of a multi-lane port with four network interface status indicators.

As illustrated by FIGS. 1 and 2, today's networking devices can have ports composed of multiple underlying signaling lanes. These signaling lanes could be grouped together in different ways to create one or more data channels running at different data rates.

For example, a typical QSFP28 transceiver (Quad Small Formfactor Pluggable (QSFP) transceiver) has four underlying 25 gigabits per second (Gbps) signaling lanes. These four lanes can be grouped together to pass a single 100 Gbps channel, which connects to a single peer or split into four independent channels, each running at 25 Gbps, and which are potentially connected to different peers. This split configuration is known as a 'breakout'.

To cater for the case of breakouts, an existing solution is to provision one LED per an underlying signaling lane (e.g., four LEDs per port in the case of a QSFP28 port), which leads to a number of downsides as follows.

Considering a 64-port QSFP28 based networking device, this would require four LEDs per port-a total of 256 LEDs, which then:
- increases system complexity (e.g., Printed Circuit Board (PCB) routing, layers, etc.);
- decreases system Mean Time Between Failure (MTBF)-MTBF measures the average time that equipment is operating between breakdowns or stoppages, so more complexity decreases MTBF, which drives higher failure rates;
- requires a higher degree of manufacturing difficulty-including alignment of large numbers of LEDs with the device front panel, increased numbers of small surface mount components, etc. which, in turn, results in a lower yield;
- requires a higher power consumption when in operation;
- causes resource wastage—it is unusual for all ports to be used in breakout mode, and yet the LEDs are present on all ports just in case; and
- requires higher manufacturing and operating costs due to all of the above-described downsides.

The downsides of existing solutions are further exacerbated with the emergence of ports with a greater number of signaling lanes-QSFP-DD and OSFP (Octal Small Formfactor Pluggable) types of networking devices both have ports with 8 signaling lanes, and OSFP-XD even supports 16-lane ports. A 64-port version of these networking devices would require 512 or 1024 LEDs, respectively.

Finally, as most networking devices are deployed in dedicated equipment rooms with only intermittent operator presence, permanently lit LEDs often are unnecessary for the majority of the time, further wasting energy.

A goal of this disclosure is to limit the number of status indicators such as LEDs used per a respective port to a single unit of LED, with a defined scheme for behaviors, regardless of the number of signals present on the respective port. Most of the challenges/downsides detailed above can be resolved by reducing the number of LEDs per a multi-lane port.

In embodiments disclosed herein, this goal can be realized by defining a scheme of flashes (i.e., a flashing sequence) that allows a single status indicator (e.g., an LED) to provide the same level of information as multiple discrete status indicators. This capability can be deployed on switches, routers, and other networking devices or network interfaces on servers, printers, etc. Alternate approaches might include using a small screen to show a detailed port/lane status or simply not attempting to retain the visual troubleshooting capability.

The disclosure therefore solves:
- design, manufacture, quality and cost challenges for networking device manufacturers;
- usability, energy consumption, and cost issues for end users of networking devices; and
- reduction in e-waste and excess energy consumption issues for humanity.

Figure 3:
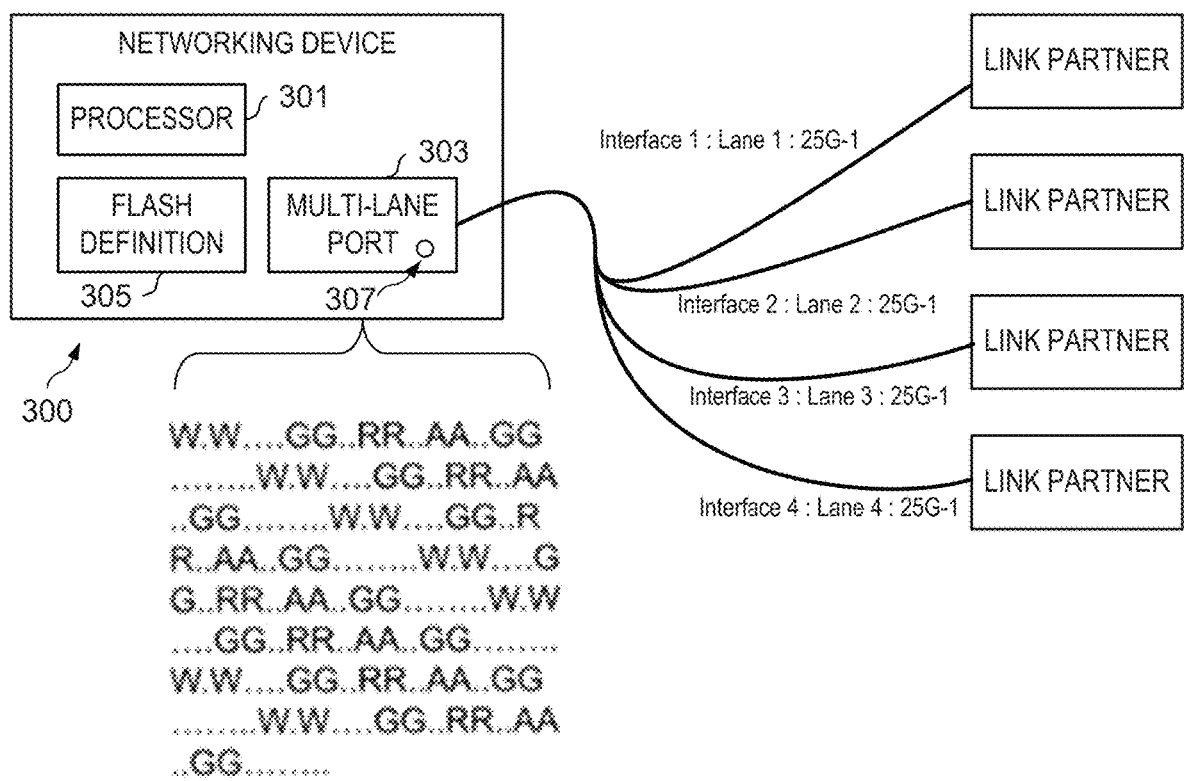
FIG. 3 shows an example of a networking device having a multi-lane port with a single network interface status indicator, according to some embodiments disclosed herein.

In an ideal scenario, only a single status indicator per a physical port would be necessary, assuming the single status indicator could still support the requirements of a technician or operator physically present in front of the device. To this end, FIG. 3 shows an example of a networking device 300 having a multi-lane port 303 with a single status indicator 307.

In some embodiments, the single status indicator is capable of showing multiple colors to encode all possible port and signaling lane states through a flashing sequence.

For the purposes of illustration, consider a 100G QSFP28 port consisting of four signaling lanes (which are also referred to hereinafter as "component lanes" or "underlying signaling lanes"). These four signaling lanes may be combined to form a single logical interface/channel or separated into various groupings, for instance, all four lanes being used together as a single interface or separated into groups of two, each group having two interfaces/channels.

Alternatively, each of the four physical lanes could be configured individually as an independent logical port.

In this example, the QSFP28 port is equipped with a single multi-color capable RGB LED (e.g., a RGB LED which can be controlled to mix proportions of red, green, and blue lights to produce a wide gamut of colors). The multi-color capable RGB LED utilizes a pattern of colored flashes (i.e., a flashing sequence defined in a flash definition) to signal the status of the four underlying signaling lanes.

To accommodate the pattern of colored flashes, a flashing scheme for the multi-color capable RGB LED needs to meet certain criteria for usability:
- It must be possible to know deterministically when a sequence of flashes begins.
- The number of flashes should be consistent for all ports with the same number of lanes
  - which implies some traditional states that turned off the LED now need to be indicated by a positive signal in order to maintain a complete sequence Flashes on multiple ports should be synchronized to minimize distraction when an operator is trying to focus on a single port.

Where the port state is common to all underlying lanes (e.g., all on, all off), the LED may be set to a static color-thus minimizing the number of flashing LEDs on the system.

The timing of the flashing sequence should be:
  at such a frequency that does not induce seizures in photo-sensitive epilepsy susceptible users (avoid the 3-60 Hz range)
  adjustable to allow users to speedup or slow down according to their preferences The color palette should be adjustable:
  to allow for a specific palette for users with visual impairments
  to allow users to redefine the meaning of signals to their own preference To this end, Table 2 below shows a non-limiting example of a scheme of flashes (i.e., a flash definition) that allows a single LED to signal the status of each individual lane of a 4-lane port.

TABLE 2

| Seq | State Name | Flash Definition | Flash Duration | Pause Duration |
|---|---|---|---|---|
| 1 | Preamble | Two fast flashes to indicate sequence start | x+ | x |
| 2 | Pause | OFF | | 2x |
| 3 | Lane 1 Status | Lane 1 status color | 2x | |
| 4 | Pause | OFF | | 2x |
| 5 | Lane 2 Status | Lane 2 status color | 2x | |
| 6 | Pause | OFF | | 2x |
| 7 | Lane 3 Status | Lane 3 status color | 2x | |
| | Pause | OFF | | 2x |
| | Lane 4 Status | Lane 4 status color | 2x | |
| | Pause | OFF | | 2x |
| 4 | Optional Padding | If a port has less physical lanes than other front panel ports, padding could be applied to wait until all ports complete the lane status state. | | |
| 5 | Beacon* | Fast flashes to draw attention to a particular port-non beaconing ports remain in Pause | x | x |
| 6 | Pause | OFF | | 2x |

'x' represents a unit of time.

When a port is beaconing, it will default to the flashing sequence, rather than a solid color, even if all lanes are in a common state. This is further described below.

In some embodiments, a flash definition defining a flashing sequence for a single status indicator dedicated for a multi-lane port on a networking device can be stored on the networking device and accessible by a processor of the networking device. The processor is configured for determining a flashing sequence for the single status indicator based on the flash definition and a current status (state) of each lane on startup of the multi-lane port, monitoring the multi-lane port for any state change of a respective lane of the multi-lane port at the lane/network interface level (e.g., a link connecting the respective lane to a link partner has gone down or something went bad), and causing the single status indicator to change the status color of the respective lane so the state change of the respective lane is timely reflected via the single status indicator. As those skilled in the art will appreciate, a link partner refers to a device that the Ethernet adapter of a networking device is connected to in an Ethernet connection. For instance, a link partner can be a switch, hub, router, computer workstation, server or some other device that the adapter is connected to.

The flashing sequence for the single status indicator is not changed, i.e., the flashing sequence is not affected by the state change of the respective lane. In some embodiments, the flashing sequence can be modified by updating the flash definition. In some embodiments, the flash definition, configuration (e.g., color coding), processor, etc. can be updated and/or enhanced by, for instance, updating the firmware or programmable logic of the networking device.

In some embodiments, the color of the single status indicator represents a lane state, as shown in Table 3 below.

TABLE 3

| Lane States | Color | Code | RGB Value | Example Visual Impairment Safe Color |
|---|---|---|---|---|
| Not Connect* | Purple | N | 255, 0, 255 | 0, 114, 178 |
| Up | Green | U | 0, 255, 0 | 0, 158, 115 |
| Admin Down | Amber | A | 255, 127, 0 | 230, 159, 0 |
| Local Fault | Red | L | 255, 0, 0 | 213, 94, 0 |
| Remote Fault | Red | R | 255, 0, 0 | 213, 94, 0 |
| Beacon | Blue | B | 0, 0, 255 | 86, 180, 233 |
| Inactive due to configuration "Config Fault" | Red | | 255, 0, 0 | 213, 94, 0 |
| Preamble | White | W | 255, 255, 255 | 255, 255, 255 |

* In a traditional 1 LED per lane model, unconnected ports have their respective LEDs set to off. However, in the flashing scheme disclosed herein, an explicit 'Not Connect' state is required to ensure that there are no gaps in the flashing sequence as such gaps could lead to misinterpretation.

When all lanes of the port are operating the same, the single status indicator constantly stays the same static color that reflects that status. For instance, if all lanes are up, the single status indicator could be static green (i.e., not flashing). When there is some inconsistent status, the single status indicator for that specific port begins to flash the entire flashing sequence, not just one specific color. The whole sequence is used to show the viewer which lanes are in which state. While RGB colors are configurable to distinguish the states listed in Table 3 above, the colors and corresponding RGB values are not limited to those shown in Table 3. For instance, in an alternative embodiment, visual impairment safe colors could be configured to correspondingly represent different lane states, as shown in Table 3.

In some embodiments, steady state status indicators can help to reduce visual cross-talk to allow operators to focus on ports that have non-static status. To this end, Table 4 below shows a normal running configuration.

TABLE 4

| Status | LED State |
|---|---|
| Entire port down/no transceiver or cable | OFF |
| Entire port admin disabled | Solid Yellow/Amber |
| Entire port is up | Solid Green |
| Entire port has a fault | Solid Red |

EXAMPLE 1 (FIG. 3)

FIG. 3 shows a networking device 300 having a multi-lane port 303 with a single status indicator 307. As illustrated in FIG. 3, the networking device 300 can have a processor 301 configured for monitoring the multi-lane port 303 and controlling the single status indicator 307 of the multi-lane port 303 based on a flash definition 305 stored at a storage location on the networking device 300.

As a non-limiting example, the multi-lane port 303 can have four underlying signaling lanes. In this example, these four individual lanes can operate at up to 25 Gbps each, each lane connecting to a link partner.

In the example of FIG. 3, the port's state is two lanes (1,4) up, while the second lane has a remote fault and the third lane is down for an administrative reason. Following the flash definition (see, e.g., Table 2), the single status indicator (e.g., an LED) will go through the following series of flashes to visually indicate a corresponding lane status:
1. Preamble (to indicate the start of a flashing sequence)
2. Green flash (to indicate that the first lane is up)
3. Red flash (to indicate that the second lane has a remote fault)
4. Amber flash (to indicate that that third lane is down administratively)
4. Green flash (to indicate that the fourth lane is up)
5. Pause (to indicate that the LED is off, i.e., the sequence is over until the next preamble)

FIG. 3 shows how the LED 307 may cycle through a series of flashes to indicate the current state of each of the four lanes of the 4-lane port 303. Per the flash definition described above, the LED begins with two quick white flashes (each of which is represented by the character "W") representing "preamble," followed by a pause (i.e., the LED is off for a duration of four units of time, with each unit of time being represented by a period "."). Then the LED is lit green for a duration of two units of time, "GG," indicating that the first lane is up, followed by a pause of a duration of two units of time. The LED next lights red for a duration of two units of time, "RR," indicating that the second lane has a remote fault, followed by a pause of a duration of two units of time. The LED then lights amber for a duration of two units of time, "AA," indicating that the third lane is down administratively, followed by a pause of a duration of two units of time. The LED next lights green for a duration of two units of time, "GG," indicating that the fourth lane is up. Since this is the last lane, the LED pauses for a longer duration, for eight units of time in this example. As illustrated in FIG. 3, the LED signals a series of "W.W. . . . GG. . . . RR. . . . AA. . . . GG. . . . " and cycles back to signal the same series unless there is a change in any of the four lanes' state.

Which color represents what lane state (i.e., color coding for lane state) may vary from implementation to implementation. Further, different characters can be used to represent the same lane status. For example, in Table 3 above, the character "U" (instead of the character "G") corresponds to the color green and is used to represent that a lane is up.

EXAMPLE 2 (FIG. 4)

In the example of FIG. 4, a multi-lane port's state is three lanes (1,2,4) up, while the third lane has a remote fault. Following the flash definition, a flashing sequence that reflects the multi-lane port's state can be represented as "w.w . . . uu . . . uu . . . rr . . . uu . . . ", where
each character (e.g., "w", "u", "r", ".", etc.) represents a duration of time x.
each letter represents a state (e.g., "w" for preamble, "u" for up, "r" for red or fault, "." for a pause, etc.)
successive instances of the same character (e.g., "uu", "rr", etc.) indicate that a state is maintained and the status indicator is lit continuously (i.e., the status indicator is not flashing).
a portion of the sequence, "w.w.", represents two quick white flashes as the preamble
a portion of the sequence, "uuuu", represents a constant 'up' signal in a solid color (e.g., a green LED) for 4× duration (e.g., the status indicator is not flashing)

Using a mono-spaced/fixed width font for visual representation, FIG. 4 shows a length of a flashing sequence corresponding to a number of flashes, with every 8th number called out as a marker (i.e., 1, 8, 16, 24, 32, 40, 48). In this example, the number of flashes for this particular sequence is 33, i.e., the length of the flashing sequence shown in FIG. 4 is 33.

EXAMPLE 3 (FIG. 5)

In this example, a port's state is all lanes up. Accordingly, a single status indicator for the port continuously showing a solid color (e.g., green) and not flashing due to the consistent status across all interfaces of the port. As shown in FIG. 5, this is represented by a sequence of "uuuuuuuuuuuuuuuuuuuuuuuuuuuuuuuuu". Because the status indicator does not flash, no preamble is needed (i.e., the sequence does not begin with two quick flashes, represented by "w.w."). The length of this sequence is represented by 33 "u" characters.

EXAMPLE 4 (FIG. 6)

Figures 6, 7A:
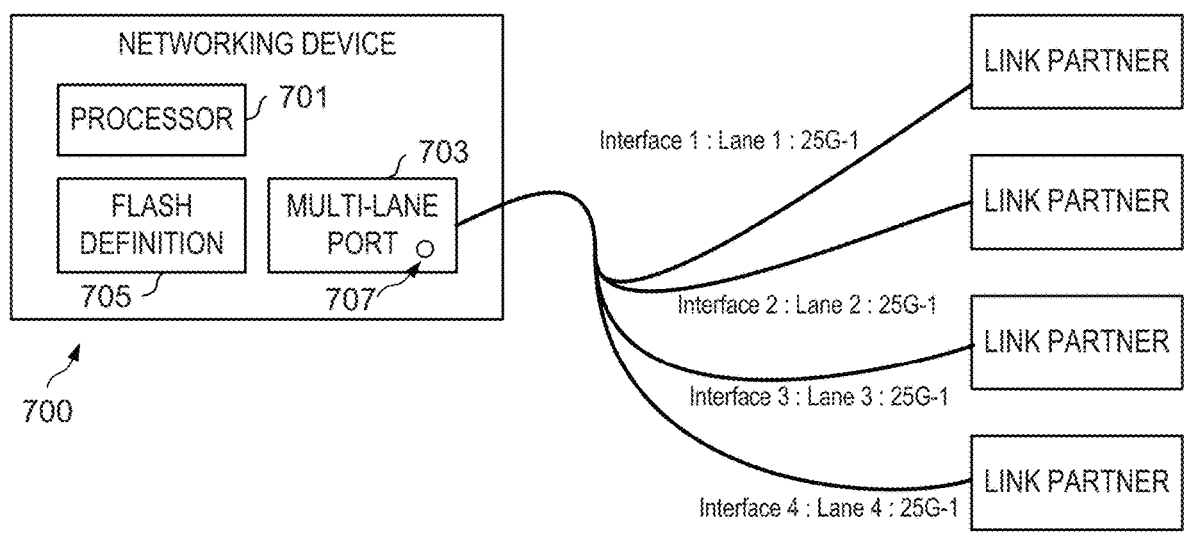
FIG. 6 shows an example of a flashing sequence of a single network interface status indicator for a 4-lane port in which all four lanes are up, with a beacon set to draw attention to the port, according to some embodiments disclosed herein.
FIGS. 7A-7C show examples of different configurations of a multi-lane port in an interface/channel signaling mode, according to some embodiments disclosed herein.

Similar to the above example, this port's state is also all lanes up. However, a beacon (which can be represented by the character "b") has been set by an administrator or operator to draw attention to the port. This means that the status will change and, therefore, the status indicator for the port will flash. In this case, the status indicator follows a flashing sequence that begins with two preamble flashes, represented by "w.w.", which indicate the start of the flashing sequence. The status indicator is then lit for two units of time per a lane, followed by "b" flashes (e.g., "w.w . . . uu . . . uu . . . uu . . . uu . . . b.b.b.b . . . "). As illustrated in FIG. 6, this flashing sequence has a length of 33 units of time. All three examples described above use the same 33 units of time, illustrating that ports in several different states will always be synchronizable.

Systems with Heterogeneous Port Types

It will be appreciated that, while this disclosure describes a solution for signaling lane states of a multi-lane port utilizing a single status indicator, the solution could equally be applied to any system where there are fewer status indicators than the number of signaling lanes per a port, with each physical status indicator responsible for showing lane states of a subset of the signaling lanes within the port.

For instance, a networking device may contain a mixture of ports with different numbers of lanes (e.g., 4-lane ports and 8-lane ports). To solve the potential issue of unsynchronized flashing sequences, status indicators for these ports can synchronize to one of the ports with the largest or highest number of lanes. For instance, for a networking device having a 4-lane port and an 8-lane port, the flashing sequence of the 4-lane port is synchronized to the flashing sequence of the 8-lane port. Table 5 below shows an example of two ports, a QSFP port with 4 lanes and a QSFP-DD port with 8 lanes.

TABLE 5

| Seq | QSFP (4 Lanes) | QSFP-DD (8 Lanes) |
|---|---|---|
| 1 | Preamble | Preamble |
| 2 | Pause | Pause |
| 3 | Lane 1 status | Lane 1 status |
| 4 | Lane 2 status | Lane 2 status |
| 5 | Lane 3 status | Lane 3 status |
| 6 | Lane 4 status | Lane 4 status |
| 7 | OFF | Lane 5 status |
| 8 | OFF | Lane 6 status |
| 9 | OFF | Lane 7 status |
| 10 | OFF | Lane 8 status |
| 11 | Pause/Beacon | Pause/Beacon |

Power Saving Mode

As most devices reside in "lights-out" facilities, there is a desire to provide a 'power saving' or 'economy' mode for power saving. Such a 'power saving' or 'economy' mode can help to reduce light pollution from adjacent ports when trying to determine which port on a dense faceplate needs attention. In such a mode, a power saving scheme could operate as follows:

All status indicators are active for a user-configurable duration (e.g., 10 minutes) after system initialization.

In normal running, all status indicators are disabled unless there is a fault or beacon condition (i.e., a flashing sequence is required) in which case, the status indicator for the affected interface will be lit.

After a port is serviced (e.g., a replacement transceiver or cable is disconnected and reconnected), the affected port is lit for a user-configurable duration (e.g., 10 minutes) regardless of status.

The operator can enable or disable a particular interface's status indicator via a Command Line Interface (CLI). This may have an automated expiry timer.

Interface/Channel Signaling Mode

Embodiments of the Port/Lane Signaling Mode described above focus on the requirement to signal the statuses of all underlying signaling lanes of a multi-lane port through a single status indicator to provide an administrator or operator with a detailed view or visual indication of the current operation of the multi-lane port. This single status indicator per a multi-lane port approach is flexible to support alternative embodiments which may be implemented alone or activated through a user-provided configuration (e.g., to switch between different modes of signaling).

As illustrated in FIG. 7A, a networking device 700 can have a processor 701 configured for monitoring a multi-lane port 703 and controlling a status indicator 707 of the multi-lane port 703 based on a flash definition 705 stored at a storage location on the networking device 700. As a non-limiting example, the multi-lane port 703 can be a QSFP port having four underlying signaling lanes. In this example, these four individual lanes can operate at up to 25 Gbps each. These lanes may be configured as unique interfaces or channels, each connecting to a different link partner. In the example of FIG. 7A, the four individual lanes connect to four link partners over four connections.

Figure 7B:
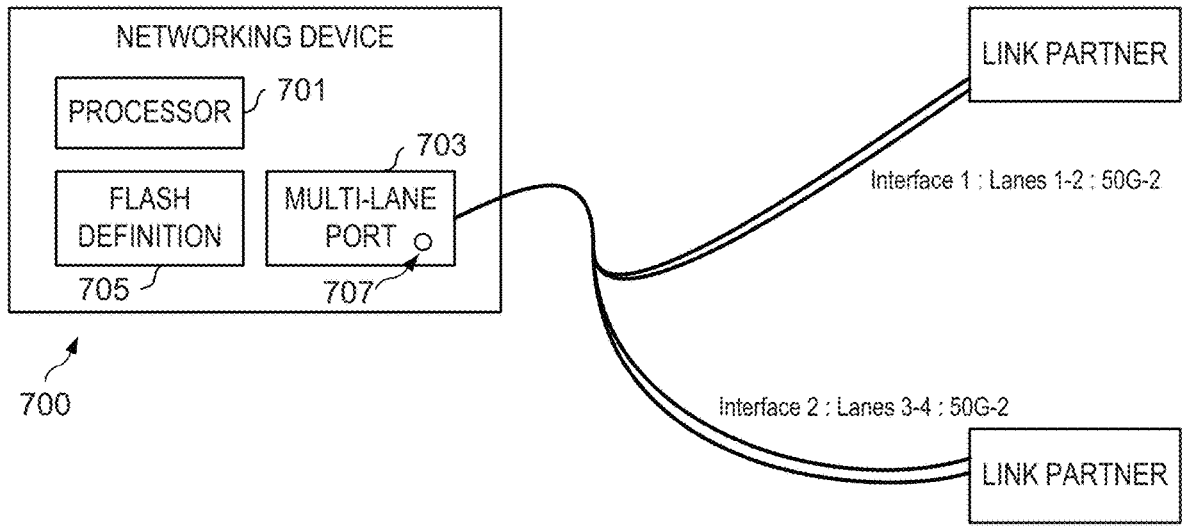
Figure 7C:
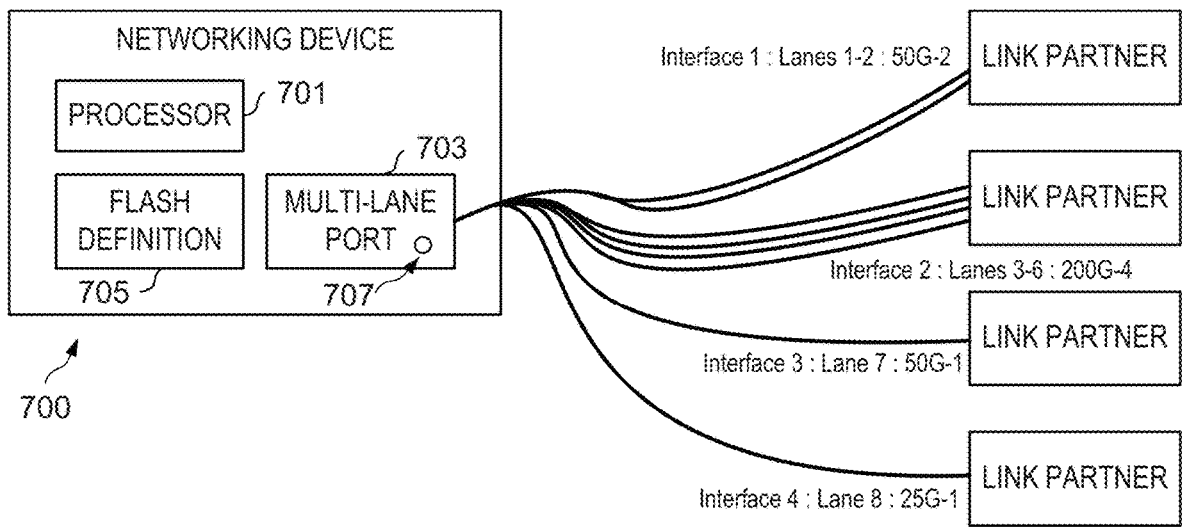

Further, as illustrated in FIGS. 7B and 7C, in some embodiments, these interfaces or channels can be combined in various ways to form higher bandwidth channels. Table 6 below provides some examples.

TABLE 6

| Lanes per Interface/ Channel | Lane Speed | Interface/ Channel Aggregate Speed | Number of Interfaces/ Channels per Port | Nomenclature |
|---|---|---|---|---|
| 1 | 25 Gbps | 25 Gbps | 4 | 4 × 25G-1* |
| 2 | 25 Gbps | 50 Gbps | 2 | 2 × 50G-2 |
| 4 | 25 Gbps | 100 Gbps | 1 | 1 × 100G-4 |

* 4 channels of 25 Gbps, each corresponding to an underlying lane. Accordingly, the multi-lane port can be configured as having one lane, two lanes, or four lanes per an interface or channel for the aggregate speed of 25 Gbps, 50 Gbps, or 100 Gbps, respectively. Such configurations allow the multi-lane port to connect to link partners over links that may operate at different connection speeds.

When multiple underlying lanes are bundled, the signaling of the data traversing the corresponding channel usually is unaware of the construction of the underlying channel's make up. That is, data is distributed across all bearer lanes at a low level and the channel will cease to operate if any component lane is unavailable. For instance, a 100 Gbps channel is made up of four 25 Gbps lanes. For the 100 Gbps channel to operate, all four 25 Gbps lanes must be up and available. If any one or more lanes experiences failure, the whole 100 Gbps channel is considered inoperable. In such a case, the status of the channel depends on all of its component lanes, rather than the state of each individual physical lane, and the status of the channel, as a whole, is more important to an administrator or operator.

In the Interface/Channel Signaling Mode, a status indicator does not flash individual lane status. Rather, the status indicator implements a flashing sequence that reflects the configuration of a channel on the port. Depending on the information that an administrator or operator wants the status indicator to convey, the administrator or operator can switch between modes, dynamically changing the behaviors of the port.

In some embodiments, the total length of a flashing sequence is dynamically optimized based on the largest number of channels per a port configured on the system, rather than the port with the largest/highest number of lanes. Consider an example system with a mix of ports (e.g., a QSFP28 port with four lanes and a QSFP-DD port with eight lanes). In the Port/Lane Signaling Mode, a 4-lane port would be required to synchronize its flashing sequence to the flashing sequence of a 8-lane port, because the 8-port has the largest/highest number of lanes. However, in the Interface/ Channel Signaling Mode, if there are no more than four interfaces/channels configured on any port, the length of the flashing sequence can be shortened to four flashes.

EXAMPLE 1 (FIG. 7A)

Table 7 below shows a QSFP28 port configured for a 4-way breakout as follows.

TABLE 7

| Interface/ Channel | Interface/ Channel Speed | Underlying Lane Number | Lane Speed | Description |
|---|---|---|---|---|
| 1 | 25 Gbps | 1 | 25 Gbps | A 25G-1 interface |
| 2 | 25 Gbps | 2 | 25 Gbps | A 25G-1 interface |

TABLE 7-continued

| Interface/<br>Channel | Interface/<br>Channel<br>Speed | Underlying<br>Lane<br>Number | Lane<br>Speed | Description |
|---|---|---|---|---|
| 3 | 25 Gbps | 3 | 25 Gbps | A 25G-1 interface |
| 4 | 25 Gbps | 4 | 25 Gbps | A 25G-1 interface |

The QSFP28 port is associated with a flash definition shown in Table 8 below.

TABLE 8

| Seq | Port/Lane Mode | Interface/Channel Mode |
|---|---|---|
| 1 | Preamble | Preamble |
| 2 | Pause | Pause |
| 3 | Lane 1 status | Interface 1 status |
| 4 | Lane 2 status | Interface 2 status |
| 5 | Lane 3 status | Interface 3 status |
| 6 | Lane 4 status | Interface 4 status |
| 7 | Pause/Beacon | Pause/Beacon |

In this example, a status indicator is signaling the status of four unique objects. Because there is a one-to-one mapping between the interfaces and the lanes, there is no visual difference between the Port/Lane Signaling Mode and the Interface/Channel Signaling Mode.

EXAMPLE 2 (FIG. 7B)

Table 9 below shows a QSFP28 port configured for a 2-way breakout as follows.

TABLE 9

| Interface/<br>Channel | Interface/<br>Channel<br>Speed | Underlying<br>Lane<br>Number | Lane<br>Speed | Description |
|---|---|---|---|---|
| 1 | 50 Gbps | 1-2 | 25 Gbps | A 50G-2 interface |
| 2 | 50 Gbps | 3-4 | 25 Gbps | A 50G-2 interface |

The QSFP28 port is associated with a flash definition shown in Table 10 below.

TABLE 10

| Seq | Port/Lane Mode | Interface/Channel Mode |
|---|---|---|
| 1 | Preamble | Preamble |
| 2 | Pause | Pause |
| 3 | Lane 1 status | Interface 1 status |
| 4 | Lane 2 status | Interface 2 status |
| 5 | Lane 3 status | OFF |
| 6 | Lane 4 status | OFF |
| 7 | Pause/Beacon | Pause/Beacon |

In this example, the Interface/Channel Signaling Mode requires only two flashes to indicate the status of the two 50G-2 interfaces configured on QSFP28 port, each interface corresponding to two lanes. The Port/Lane Signaling Mode requires four flashes for four individual lanes.

EXAMPLE 3 (FIG. 7C)

Table 11 below shows a QSFP-DD port with eight lanes configured for mixed breakouts of four different interface types.

TABLE 11

| Interface/<br>Channel | Interface/<br>Channel<br>Speed | Underlying<br>Lane<br>Number | Lane<br>Speed | Description |
|---|---|---|---|---|
| 1 | 50 Gbps | 1-2 | 25 Gbps | A 50G-2 interface |
| 2 | 200 Gbps | 3-6 | 50 Gbps | A 200G-4 interface |
| 3 | 50 Gbps | 7 | 50 Gbps | A 50G-1 interface |
| 4 | 25 Gbps | 8 | 25 Gbps | A 25G-1 interface |

In this case, the first interface or channel has two underlying lanes, the second interface or channel has four underlying lanes, and the third and fourth interfaces each utilize one lane at different speeds. The QSFP-DD port is associated with a flash definition shown in Table 12 below.

TABLE 12

| Seq | Port/Lane Mode | Interface/Channel Mode |
|---|---|---|
| 1 | Preamble | Preamble |
| 2 | Pause | Pause |
| 3 | Lane 1 status | Interface 1 status |
| 4 | Lane 2 status | Interface 2 status |
| 5 | Lane 3 status | Interface 3 status |
| 6 | Lane 4 status | Interface 4 status |
| 7 | Lane 5 status | OFF |
| 8 | Lane 6 status | OFF |
| 9 | Lane 7 status | OFF |
| 10 | Lane 8 status | OFF |
| 11 | Pause/Beacon | Pause/Beacon |

This example demonstrates that channels corresponding to bundled lanes in the Interface/Channel Signaling Mode always occupy one flashing slot regardless of the type of interface being indicated. Further, as described above, in the Interface/Channel Signaling Mode, the status of the individual interface or channel is more important than the status of a component lane. Moreover, for an interface or channel to operate, all of its component lanes must be available. As data is distributed across the component lanes, if any one of the component lanes experiences failure, the entire interface or channel is considered inoperable.

The Interface/Channel Signaling Mode can advantageously provide different types of administrator, operators, or the like, with the maximum flexibility to understand the current states of ports, interfaces, and lanes at a level that is appropriate to a task at hand. Another benefit of the Interface/Channel Signaling Mode is the ability to reduce the length of flashing sequences and pauses. For instance, a port with 16 lanes can be configured with four interfaces or channels, each consisting of a bundle of four lanes. In such a case, the length of the flashing sequence is reduced to four flashes (for interface 1, interface 2, interface 3, interface 4), instead of 16 (for lane 1, lane 2, . . . , lane 16).

In some embodiments, all multi-lane ports on a networking device could be configured with one signaling mode or another (e.g., in the Port/Lane Signaling Mode or the Interface/Channel Mode). In some embodiments, different multi-lane ports on a networking device could be configured with different signaling modes (e.g., one row of ports on the networking device operate in the Port/Lane Signaling Mode and another row of ports on the networking device operate in the Interface/Channel Mode). The configuration and/or dynamic change in signaling behavior could be controlled via a CLI command (by an administrator or operator), application programming interface (API), or any appropriate networking device management system, tool, or technology for configuring a networking device.

Figure 8:
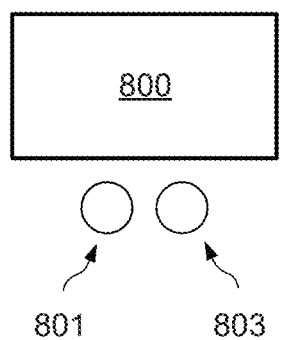
FIG. 8 shows an example of a multi-lane port with multiple network interface status indicators, according to some embodiments disclosed herein.

As illustrated in FIG. 8, in some embodiments, a multi-lane port 800 may have two status indicators 801, 803. One status indicator may, through a corresponding flashing sequence, indicate the state of lanes (e.g., in the Port/Lane Signaling Mode), while another status indicator may, through a different flashing sequence, indicate the state of interfaces or channels (in the Interface/Channel Signaling Mode), each interface or channel bundling a plurality of underlying component lanes. In some embodiments, the status indicators of a multi-lane port may be configured to operate in the same signaling mode. In some embodiments, a multi-lane port may have a number of status indicators that is less than the number of underlying lanes or interfaces. For example, each of two status indicators for a 4-lane port may signal the status of an interface or channel, with each interface or channel bundling two component lanes. As another example, each of four status indicators for a 16-lane port may signal the status of an interface or channel, with each interface or channel bundling four component lanes. As yet another example, a plurality of status indicators for a multi-lane port may each implement a flashing sequence for a heterogeneous multiple (e.g., 2, 4, 8, etc.) of lane(s) and/or interface(s).

The ability to use only a single status indicator per a multi-lane port, with a defined scheme for behaviors, solves the problems discussed above. Further, the ability to dramatically reduce dependency on individual LEDs to represent each signaling lane of a networking device, while retaining the troubleshooting capabilities that end users are trained on, provides wide ranging benefits including:

Reduced system complexity-lower cost, higher reliability

Simplified manufacturing-higher yield, faster production, lower costs.

Reduced power consumption-lower energy burden on end user and the environment

Fewer resources wasted-removes overprovisioning-lower environmental impact and less future e-waste In this disclosure, specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A status signaling method, the method comprising:
   determining a flash definition that specifies a flashing sequence for a status indicator of a multi-lane port, the multi-lane port having a plurality of component lanes;
   storing the flash definition on a device with the multi-lane port; and
   configuring the multi-lane port utilizing the flash definition such that, in operation, the status indicator is lit, following the flashing sequence specified in the flash definition, to indicate a current state of a respective component lane of the plurality of component lanes or of a subset of the plurality of component lanes of the multi-lane port, wherein the subset of the plurality of component lanes corresponds to an interface or channel.

2. The status signaling method according to claim 1, wherein the flash definition comprises a preamble, status colors each corresponding to a lane state or to an interface state, a flash duration, a pause, and a pause duration.

3. The status signaling method according to claim 1, wherein the flashing sequence begins with a preamble and wherein the preamble indicates a start of the flashing sequence.

4. The status signaling method according to claim 1, wherein the device comprises a networking device having multi-lane ports, wherein the multi-lane ports are configured with flashing sequences having a first sequence length and a second sequence length, and wherein the second sequence length is longer than the first sequence length.

5. The status signaling method according to claim 4, further comprising:
   synchronizing the flashing sequences for the multi-lane ports to one of the flashing sequences having the second sequence length.

6. The status signaling method according to claim 1, wherein the plurality of component lanes operates at same speed or different speeds.

7. The status signaling method according to claim 1, wherein the status indicator is one of a plurality of status indicators for the multi-lane port, wherein each of the plurality of status indicators is configured for indicating a state of one or more component lanes or one or more interfaces, and wherein an interface includes one or more component lanes.

8. A system, comprising:
- a status indicator for a multi-lane port on a device, the multi-lane port having a plurality of component lanes;
- a processor;
- a non-transitory computer-readable medium; and
- a flash definition and instructions stored on the non-transitory computer-readable medium, the flash definition specifying a flashing sequence for the status indicator, the instructions translatable by the processor for controlling, based at least on the flash definition, the status indicator such that, in operation, the status indicator is lit, following the flashing sequence specified in the flash definition, to indicate a current state of a respective component lane of the plurality of component lanes or a subset of the plurality of component lanes of the multi-lane port, wherein the subset of the plurality of component lanes corresponds to an interface or channel.

9. The system of claim 8, wherein the flash definition comprises a preamble, status colors each corresponding to a lane state or to an interface state, a flash duration, a pause, and a pause duration.

10. The system of claim 8, wherein the flashing sequence begins with a preamble and wherein the preamble indicates a start of the flashing sequence.

11. The system of claim 8, wherein the device comprises a networking device having multi-lane ports, wherein the multi-lane ports are configured with flashing sequences having a first sequence length and a second sequence length, and wherein the second sequence length is longer than the first sequence length.

12. The system of claim 11, wherein the instructions are further translatable by the processor for synchronizing the flashing sequences for the multi-lane ports to one of the flashing sequences having the second sequence length.

13. The system of claim 8, wherein the plurality of component lanes operates at same speed or different speeds.

14. The system of claim 8, wherein the status indicator is one of a plurality of status indicators for the multi-lane port, wherein each of the plurality of status indicators is configured for indicating a state of one or more component lanes or one or more interfaces, wherein an interface includes one or more component lanes.

15. An apparatus, comprising:
- a multi-lane port having a plurality of component lanes;
- a status indicator for the multi-lane port;
- a non-transitory computer-readable medium storing a flash definition that specifies a flashing sequence for the status indicator; and
- a processor configured for controlling, based at least on the flash definition, the status indicator such that, in operation, the status indicator is lit, following the flashing sequence specified in the flash definition, to indicate a current state of a respective component lane of the plurality of component lanes or a subset of the plurality of component lanes of the multi-lane port, wherein the subset of the plurality of component lanes corresponds to an interface or channel.

16. The apparatus of claim 15, wherein the flash definition comprises a preamble, status colors each corresponding to a lane state or to an interface state, a flash duration, a pause, and a pause duration.

17. The apparatus of claim 15, further comprising:
- a plurality of multi-lane ports configured with flashing sequences, the flashing sequences having a first sequence length and a second sequence length, wherein the second sequence length is longer than the first sequence length.

18. The apparatus of claim 17, wherein the processor is further configured for synchronizing the flashing sequences for the plurality of multi-lane ports to one of the flashing sequences having the second sequence length.

19. The apparatus of claim 15, wherein the plurality of component lanes operates at same speed or different speeds.

20. The apparatus of claim 15, wherein the status indicator is one of a plurality of status indicators for the multi-lane port, wherein each of the plurality of status indicators is configured for indicating a state of one or more component lanes or one or more interfaces, and wherein an interface includes one or more component lanes.

* * * * *